(12) United States Patent
Yamamoto

(10) Patent No.: US 9,791,764 B2
(45) Date of Patent: Oct. 17, 2017

(54) IMAGE PICKUP APPARATUS ENABLING AUTOMATIC IRRADIATION DIRECTION CONTROL, LIGHTING DEVICE, IMAGE PICKUP SYSTEM, AUTOMATIC IRRADIATION DIRECTION CONTROL METHOD, AND STORAGE MEDIUM STORING PROGRAM THEREFOR

(71) Applicant: CANON KABUSHIKI KAISHA, Tokyo (JP)

(72) Inventor: Yuji Yamamoto, Kasukabe (JP)

(73) Assignee: Canon Kabushiki Kaisha, Tokyo (JP)

( * ) Notice: Subject to any disclaimer, the term of this patent is extended or adjusted under 35 U.S.C. 154(b) by 159 days.

(21) Appl. No.: 14/689,176

(22) Filed: Apr. 17, 2015

(65) Prior Publication Data

US 2015/0309390 A1 Oct. 29, 2015

(30) Foreign Application Priority Data

Apr. 28, 2014 (JP) .................. 2014-092720

(51) Int. Cl.
*H04N 5/222* (2006.01)
*G03B 15/05* (2006.01)
*H04N 5/225* (2006.01)
*H04N 5/235* (2006.01)
*G03B 7/17* (2014.01)

(52) U.S. Cl.
CPC ............. *G03B 15/05* (2013.01); *G03B 7/17* (2015.01); *H04N 5/2256* (2013.01); *H04N 5/2354* (2013.01); *G03B 2215/0514* (2013.01)

(58) Field of Classification Search
None
See application file for complete search history.

(56) References Cited

U.S. PATENT DOCUMENTS

2009/0310013 A1* 12/2009 Odaka .................. G03B 15/03
348/371

FOREIGN PATENT DOCUMENTS

JP 04-340527 A 11/1992

* cited by examiner

*Primary Examiner* — Stephen Coleman
(74) *Attorney, Agent, or Firm* — Fitzpatrick, Cella, Harper & Scinto

(57) ABSTRACT

An image pickup apparatus that is capable of performing suitable automatic irradiation direction control in a case where the automatic irradiation direction control for a lighting device is operated by a plurality of operation members. The lighting device that changes an irradiation direction of a light emitting section is mounted or is attachable to the image pickup apparatus. A first operation member starts automatic irradiation direction control that drives the light emitting section to direct in a determined irradiation direction, and starts photographing preparation. A second operation member starts the automatic irradiation direction control. A control unit continuously performs the automatic irradiation direction control in operation without stopping when the second operation member is operated during the automatic irradiation direction control owing to the operation of the first operation member.

11 Claims, 13 Drawing Sheets

FIG. 4A

| AUTO BOUNCE INFORMATION TO EXTERNAL FLASH DEVICE FROM CAMERA |
|---|
| • AUTO BOUNCE START COMMAND |
| • AUTO BOUNCE STOP COMMAND |
| • AUTO BOUNCE START SWITCH INFORMATION (SW1, SWAB) |

FIG. 4B

| AUTO BOUNCE INFORMATION TO CAMERA FROM EXTERNAL FLASH DEVICE |
|---|
| • AUTO BOUNCE START |
| • AUTO BOUNCE STOP |
| • AUTO BOUNCE IN OPERATION |
| • AUTO BOUNCE START SWITCH INFORMATION (ST_ SWAB) |

IMAGE PICKUP APPARATUS ENABLING AUTOMATIC IRRADIATION DIRECTION CONTROL, LIGHTING DEVICE, IMAGE PICKUP SYSTEM, AUTOMATIC IRRADIATION DIRECTION CONTROL METHOD, AND STORAGE MEDIUM STORING PROGRAM THEREFOR

BACKGROUND OF THE INVENTION

Field of the Invention

The present invention relates to an image pickup apparatus, a lighting device, an image pickup system, an automatic irradiation direction control method, and its program, and in particular, relates to a technique of automatic irradiation direction control for flash photography.

Description of the Related Art

There is a photography method called bounce flash photography in which a flash light from an electronic flash device is emitted toward a ceiling, etc., so as to irradiate a subject with diffuse reflection from the ceiling etc. Since a subject is illuminated indirectly in the bounce flash photography, the subject is photographed with a soft light.

There is a known auto-bounce-control technique that enables the optimal bounce flash photography automatically without requiring a user (photographer) to set a bounce angle (an angle of a light emitting section for bounce flash photography) (for example, see Japanese Laid-Open Patent Publication (Kokai) No. H04-340527 (JP H04-340527A)). In the auto bounce control, a distance to a ceiling, etc., and a distance to a subject are measured. Then, the optimal bounce angle is determined on the basis of the obtained measurement values so that the subject is photographed with a soft light, and an electronic flash device is driven so that the angle of the light emitting section becomes the determined bounce angle.

In the technique in the above-mentioned publication, when a photometry switch interlocked with a release button for starting a photometry action, a ranging action, etc., to a subject turns ON, the auto bounce control starts.

However, such a configuration that starts the auto bounce control with one button may disable prompt execution of the suitable bounce flash photography depending on a photographing condition. On the other hand, a configuration that allows the auto bounce control with a plurality of buttons can be considered. However, when the plurality of buttons are continuously operated in this case, there is a possibility that suitable auto bounce control cannot be performed.

SUMMARY OF THE INVENTION

The present invention provides a technique that is capable of performing suitable automatic irradiation direction control in a case where the automatic irradiation direction control for a lighting device is operated by a plurality of operation members.

Accordingly, a first aspect of the present invention provides an image pickup apparatus to which a lighting device that changes an irradiation direction of a light emitting section is mounted or is attachable. The image pickup apparatus includes a first operation member configured to start automatic irradiation direction control that drives the light emitting section to direct in a determined irradiation direction, and to start photographing preparation, a second operation member configured to start the automatic irradiation direction control, and a control unit configured to continuously perform the automatic irradiation direction control in operation without stopping when the second operation member is operated during the automatic irradiation direction control owing to the operation of the first operation member.

Accordingly, a second aspect of the present invention provides a lighting device including a light emitting section, a drive control unit configured to perform automatic irradiation direction control so that the light emitting section is automatically directed in a determined irradiation direction, a communication unit configured to transmit information about the automatic irradiation direction control to a connected image pickup apparatus.

Accordingly, a third aspect of the present invention provides an image pickup system including a lighting device configured to change an irradiation direction of a light emitting section, and an image pickup apparatus to which the lighting device is attached. The lighting device includes a lighting-device-side operation member configured to start automatic irradiation direction control that drives the light emitting section to direct in a determined irradiation direction. The image pickup apparatus includes a first operation member configured to start the automatic irradiation direction control, and to start photographing preparation, a control unit configured to determine an irradiation direction automatically to perform the automatic irradiation direction control, to stop the automatic irradiation direction control in operation to redo the automatic irradiation direction when the first operation member is operated during the automatic irradiation direction control, and to continuously perform the automatic irradiation direction control in operation without stopping when the lighting-device-side operation member is operated during the automatic irradiation direction control owing to the operation of the first operation member.

Accordingly, a fourth aspect of the present invention provides an automatic irradiation direction control method for an image pickup apparatus to which a lighting device that changes an irradiation direction of a light emitting section is mounted or is attachable, having a first operation member that starts automatic irradiation direction control that drives the light emitting section to direct in a determined irradiation direction and starts photographing preparation, and a second operation member that starts the automatic irradiation direction control. The automatic irradiation direction control method includes starting the automatic irradiation direction control when either of the first operation member and the second operation member is operated, and performing the automatic irradiation direction control in operation continuously without stopping when the second operation member is operated during the automatic irradiation direction control owing to the operation of the first operation member.

Accordingly, a fifth aspect of the present invention provides an automatic irradiation direction control method for a lighting device that changes an irradiation direction of a light emitting section. The automatic irradiation direction control method includes starting automatic drive control in response to an operation of a first operation member for starting photographing preparation of a connected image pickup apparatus, and performing the automatic irradiation direction control in operation continuously without stopping when a second operation member, which is different from the first operation member, is operated during the automatic irradiation direction control owing to the operation of the first operation member.

Accordingly, a sixth aspect of the present invention provides an automatic irradiation direction control method for an image pickup system that is configured by attaching a lighting device that changes an irradiation direction of a light emitting section to an image pickup apparatus. The lighting device has a lighting-device-side operation member that starts automatic irradiation direction control that drives the light emitting section to direct in a determined irradiation direction. The image pickup apparatus has a first operation member that starts the automatic irradiation direction control and starts photographing preparation. The automatic irradiation direction control method includes starting the automatic irradiation direction control when either of the first operation member and the lighting-device-side operation member is operated, and performing the automatic irradiation direction control in operation continuously without stopping when the lighting-device-side operation member is operated during the automatic irradiation direction control owing to the operation of the first operation member.

Accordingly, a seventh aspect of the present invention provides a non-transitory computer-readable storage medium storing an automatic irradiation direction control program causing a computer provided in an image pickup apparatus to execute the automatic irradiation direction control method of the fourth aspect.

Accordingly, an eighth aspect of the present invention provides a non-transitory computer-readable storage medium storing an automatic irradiation direction control program causing a computer provided in an image pickup apparatus to execute the automatic irradiation direction control method of the fifth aspect.

Accordingly, a ninth aspect of the present invention provides a non-transitory computer-readable storage medium storing an automatic irradiation direction control program causing a computer provided in an image pickup apparatus to execute the automatic irradiation direction control method of the sixth aspect.

According to the present invention, the suitable automatic irradiation direction control is performed in a case where the automatic irradiation direction control for a lighting device is operated by a plurality of operation members.

Further features of the present invention will become apparent from the following description of exemplary embodiments with reference to the attached drawings.

BRIEF DESCRIPTION OF THE DRAWINGS

FIG. 4A is a view showing auto bounce information transmitted to the external flash device from the camera in the step S305 in FIG. 3.

FIG. 4B is a view showing auto bounce information transmitted to the camera from the external flash device in the step S305 in FIG. 3.

DESCRIPTION OF THE EMBODIMENTS

Hereafter, embodiments according to the present invention will be described in detail with reference to the drawings. In the description, an image pickup system that consists of a digital still camera (hereinafter referred to as a "camera") as an image pickup apparatus according to an embodiment of the present invention and an external flash device as a lighting device that is attachable to the camera will be described.

Figure 1:
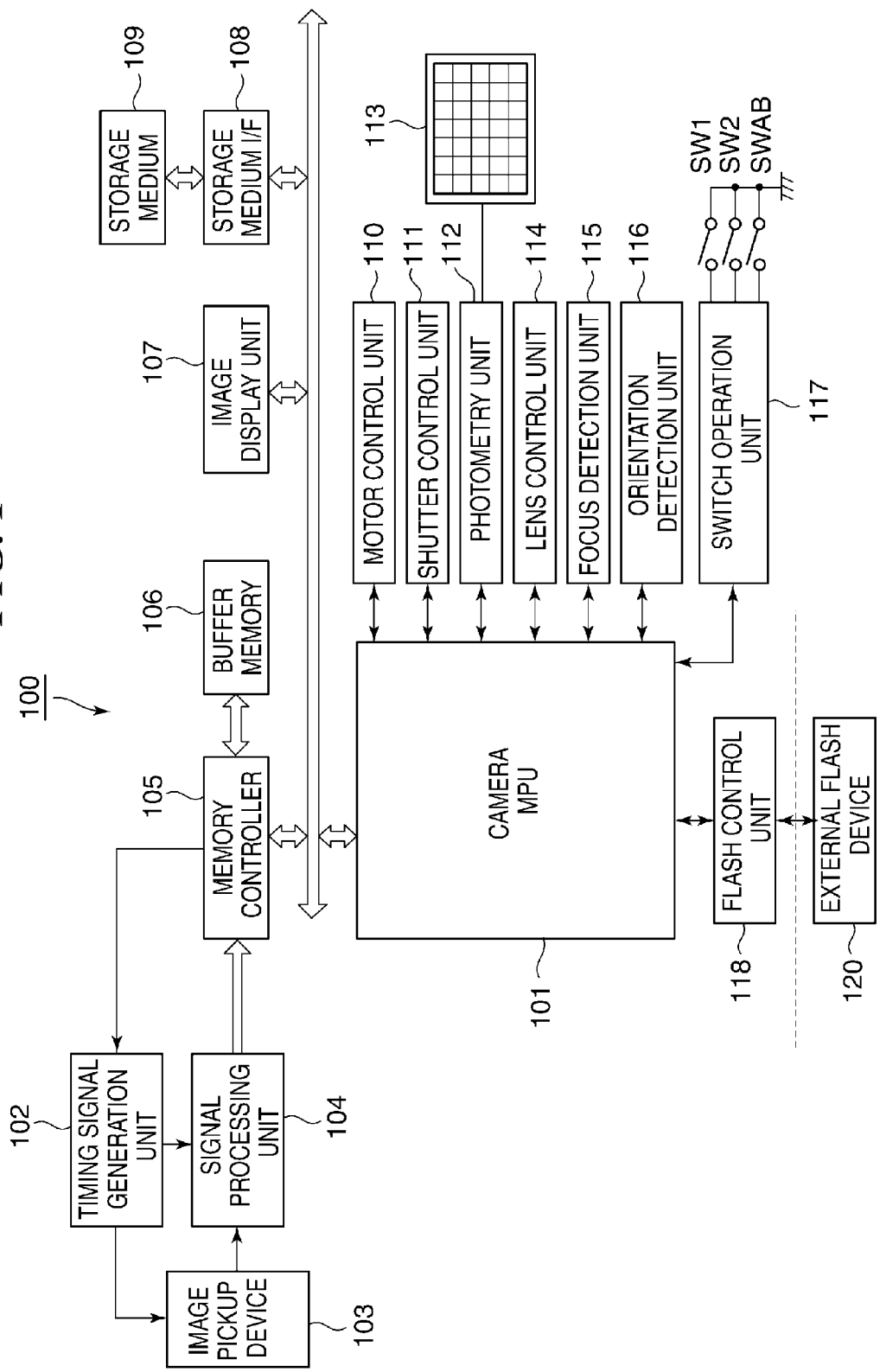
FIG. 1 is a block diagram schematically showing a configuration of a camera that constitutes an image pickup system according to a first embodiment of the present invention.

FIG. 1 is a block diagram schematically showing a configuration of the camera 100 that constitutes the image pickup system according to the embodiment of the present invention. The camera 100 is provided with an image pickup optical system (not shown), a camera MPU 101, a timing signal generating circuit 102, an image pickup device 103, a signal processing circuit 104, a memory controller 105, a buffer memory 106, an image display unit 107, and a storage-medium interface (I/F) 108. A storage medium 109 is connected to the storage-medium I/F 108.

The camera MPU 101 is a microcontroller that controls overall actions of the camera 100 including a photographing sequence. An optical image of a subject is formed on the image pickup device 103 through the image pickup optical system. The image pickup device 103 is an image sensor like as a CCD sensor or a CMOS sensor, and converts the optical image into an electrical signal.

The timing signal generation circuit 102 generates a timing signal needed to operate the image pickup device 103. The signal processing circuit 104 has an A/D converter that converts an analog signal output from the image pickup device 103 into a digital signal, and has various kinds of image processing functions that apply predetermined image processes, such as a white balance process, to the digital signal to generate image data.

The memory controller 105 controls reading, writing, a refreshment operation, etc. of the buffer memory 106. The buffer memory 106 temporarily stores the image data output from the signal processing circuit 104, and temporarily stores the image data read from the storage medium 109.

The image display unit 107 displays an image of the image data stored in the buffer memory 106. The storage-medium I/F 108 is an interface for enabling communication between the storage medium 109 and the camera MPU 101. The storage medium 109 is a memory card, a hard disk, etc., for example, and may be built in the camera 100 (body), or may be detachable to the camera 100 (body).

The camera 100 is provided with a motor control unit 110, a shutter control unit 111, a photometry unit 112, a lens control unit 114, a focus detection unit 115, an orientation detection unit 116, a switch operation unit 117, and a flash control unit 118, which are connected to the camera MPU 101. A multi-division photometry sensor 113 is connected to the photometry unit 112. An external flash device 120 is connected to the flash control unit 118.

The motor control unit 110 switches a mirror (not shown) between a mirror-up position and a mirror-down position and charges the shutter by controlling a motor (not shown) according to a signal from the camera MPU 101 at the of an exposure operation. The shutter control unit 111 makes a shutter front curtain and shutter rear curtain (not shown) travel by cutting electricity to the curtains according to signals from the camera MPU 101 in order to control an exposure operation.

The photometry unit 112 outputs signals from the multi-division photometry sensor 113, which divides an image pickup screen into a plurality of areas, to the camera MPU 101 as luminance signals of the respective areas. The camera MPU 101 converts the luminance signals received from the photometry unit 112 into digital data with an A/D converter (not shown), and performs photometry arithmetic using the digital data obtained to determine an aperture value (AV), shutter speed (TV), photographing sensitivity (ISO speed), etc. with which correct exposure is obtained.

Moreover, the photometry unit 112 outputs a luminance signal, which is obtained when the external flash device 120 performs a preliminary emission (pre-emission) toward a subject, to the camera MPU 101. The camera MPU 101 computes an amount of flash main emission at the time of exposure on the basis of the luminance signal received from the photometry unit 112.

The lens control unit 114 communicates with the camera MPU 101 through lens mount contacts (not shown), and operates a lens drive motor and a diaphragm motor (not shown) to control the focusing and the aperture of the image pickup optical system. The focus detection unit 115 detects the defocus amount to a subject for autofocus (AF). The orientation detection unit 116 detects an inclination of the camera 100 in a direction in which a photographing optical axis swings up and down, and a rotation angle of the camera 100 around the photographing optical axis. The inclination of the camera 100 is detected on the basis of a horizontal state of the camera 100 in which the photographing optical axis becomes horizontal.

The switch operation unit 117 is disposed on the camera 100 (body), and has three switches SW1, SW2, and SWAB as shown in FIG. 1. The switch SW1 functions as a photometry switch that is turned ON by half depression of a release button (not shown).

When the switch SW1 turns ON, the camera MPU 101 starts AF and photometry, and starts automatic irradiation direction control (hereinafter referred to as an "auto bounce control") of the external flash device 120. That is, the switch SW1 functions also as an auto bounce start switch. The switch SW2 functions as a release switch that is turned ON by full depression of the release button. When the switch SW2 turns on, the camera MPU 101 starts an exposure operation. The switch SWAB is an auto bounce start switch that is turned on by depression of an auto bounce start button disposed on the camera 100 (body) besides the release button.

When receiving a signal of the auto bounce control start from the camera MPU 101, the external flash device 120 automatically drives a flash head 200*b* (see FIG. 2) that includes a light emitting section 202 so as to become a predetermined angle. Moreover, the switch operation unit 117 is provided with various switches and buttons besides the switches SW1, SW2, and SWAB. A signal from each of the switches and buttons is sent to the camera MPU 101, and the camera MPU 101 executes an action allocated to a corresponding switch or button.

The flash control unit 118 instructs an emission pattern (a pre-emission or a main emission), the amount of main emission, etc. to the external flash device 120. The camera MPU 101 and the external flash device 120 communicate through the flash control unit 118 of the camera 100 and a camera terminal 209 (see FIG. 2) of the external flash device 120.

Figure 2:
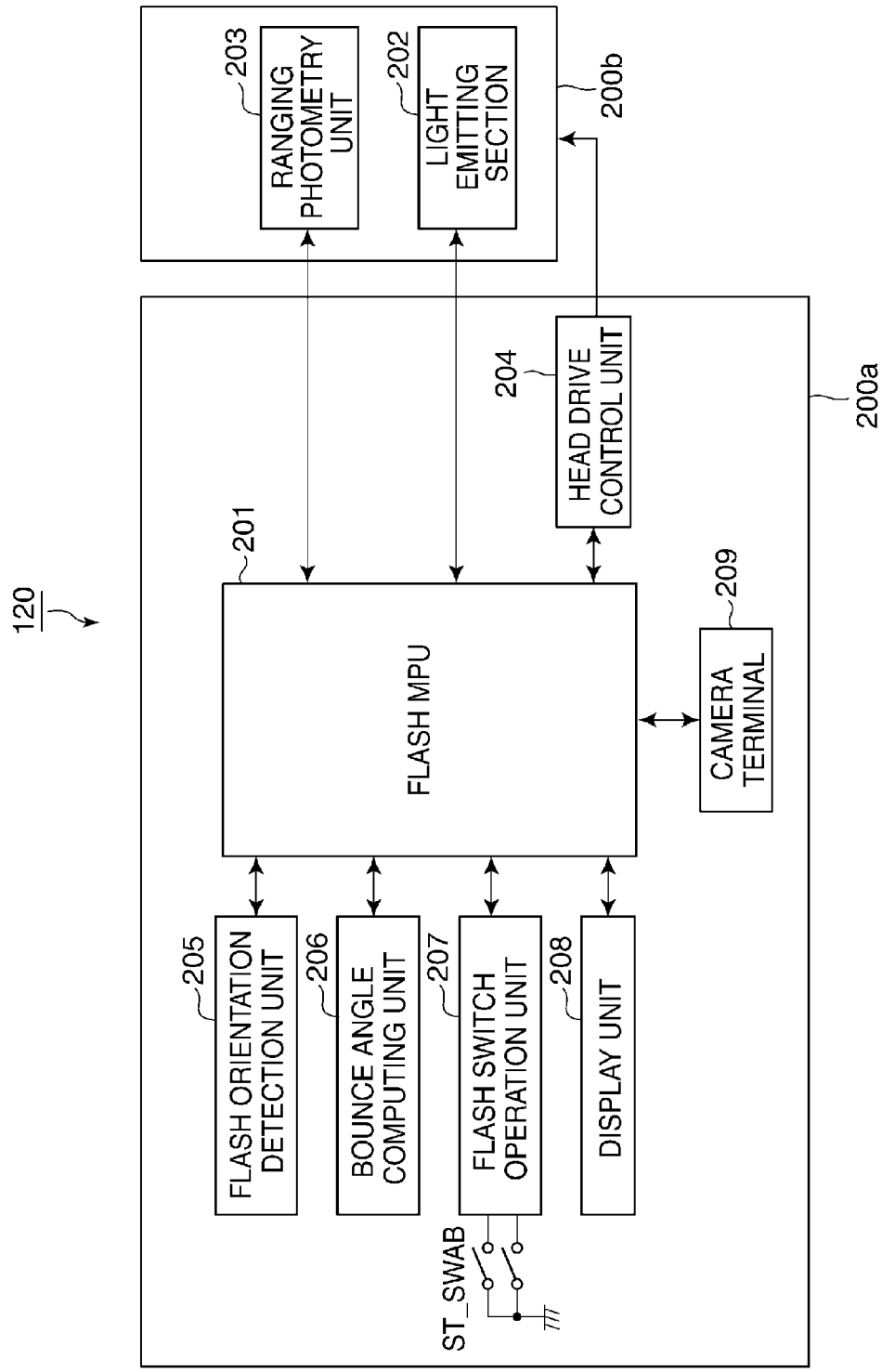
FIG. 2 is a block diagram schematically showing a configuration of an external flash device that constitutes the image pickup system according to the first embodiment of the present invention.

FIG. 2 is a block diagram schematically showing the configuration of the external flash device 120. The external flash device 120 schematically consists of a flash body 200*a* (body) and a flash head 200*b* (moving part) that is rotatable in the vertical direction and the horizontal direction with respect to the flash body 200*a*. The flash body 200*a* is provided with a flash MPU 201, a head drive control unit 204, a flash orientation detection unit 205, a bounce angle computing unit 206, a flash switch operation unit 207, a display unit 208, and the camera terminal 209. The flash head 200*b* is provided with the light emitting section 202 and a ranging photometry unit 203.

The flash MPU 201 is a microcontroller that controls overall actions of the external flash device 120 including an emission control sequence and angle determination of the flash head 200*b*. The light emitting section 202 has a strobe emission circuit (not shown) that emits a flash light according to an emission signal from the flash MPU 201.

The ranging photometry unit 203 has a ranging photometry sensor (not shown) for receiving a reflected light that is a flash light emitted from the light emitting section 202 and reflected by a ranging target. The ranging photometry unit 203 transmits a luminance signal that is output from the ranging photometry sensor to the flash MPU 201. The flash MPU 201 converts the luminance signal received from the ranging photometry unit 203 into digital data using an A/D converter (not shown), and computes the distance to the ranging target on the basis of the converted digital data.

The head drive control unit 204 drivingly controls a motor (not shown) according to a control signal from the flash MPU 201 so that the flash head 200*b* rotates vertically and horizontally with respect to the flash body 200*a*. Moreover, the head drive control unit 204 detects the drive amount of the flash head 200*b*, and sends the detection result obtained to the flash MPU 201 as information about a relative position with respect to the flash body 200*a*. The flash orientation detection unit 205 detects an inclination of the flash body 200*a* in a direction in which a photographing optical axis swings up and down, and a rotation angle of the flash body 200*a* around the photographing optical axis. The inclination of the flash body 200*a* is detected on the basis of the horizontal state of the camera 100.

The bounce angle computing unit 206 computes the optimal irradiation direction (bounce angle) on the basis of the data obtained by the ranging photometry unit 203 and the data obtained by the flash orientation detection unit 205. The flash switch operation unit 207 has a switch ST_SWAB that is turned ON by pressing an auto bounce start button disposed on the flash body 200*a*. When the switch ST_SWAB turns ON, the flash MPU 201 starts the auto bounce control of the flash head 200*b*.

It should be noted that the flash switch operation unit 207 includes a power switch of the external flash device 120, and buttons and switches for performing various settings and actions of the external flash device 120 besides the switch ST_SWAB. A signal from each of switches and buttons is sent to the flash MPU 201. The flash MPU 201 executes an action allocated to the corresponding switch or button.

The display unit 208 displays setting states of the external flash device 120, etc. The camera terminal 209 is connected with the flash control unit 118 of the camera 100. The camera MPU 101 and the flash MPU 201 perform required communication through the flash control unit 118 and the camera terminal 209.

Figure 3:
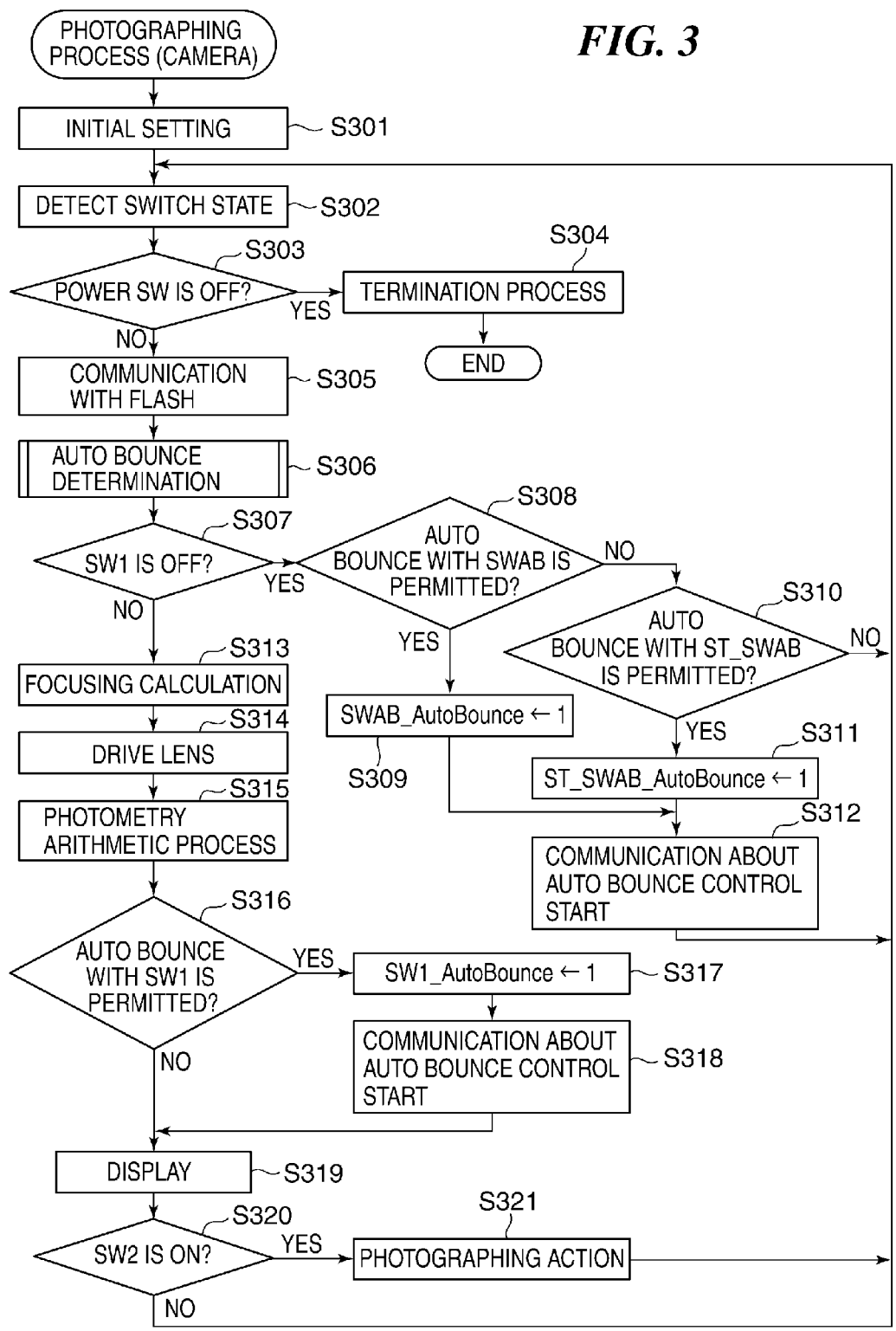
FIG. 3 is a flowchart showing a photographing process executed by the camera shown in FIG. 1 in the image pickup system according to the first embodiment.

FIG. 3 is a flowchart showing procedures of a photographing process executed by the camera 100 shown in FIG. 1 in the image pickup system according to the first embodiment. The process shown in FIG. 3 is executed by the camera MPU 101 by expanding a control program stored in a ROM (not shown) to a RAM (not shown).

In step S301, the camera MPU 101 performs initial setting, such as initialization of a register, initialization of data, and initialization of peripheries. In the following step S302, the camera MPU 101 detects the states of the switches SW1, SW2, SWAB and the other switches with which the switch operation unit 117 is provided.

Then, in step S303, the camera MPU 101 determines whether the power switch (power SW) of the camera 100 was turned OFF. When the power SW was turned OFF (YES in the step S303), the camera MPU 101 proceeds with the process to step S304. On the other hand, when the power SW is in an ON state (NO in the step S303), the process proceeds to step S305.

In the step S304, the camera MPU 101 performs a termination process for instructing the peripheries to turn the power OFF and saving the data, and then terminates this process. On the other hand, in the step S305, the camera MPU 101 communicates (performs flash communication) with the external flash device 120 that is attached to the camera 100 (body). In this flash communication, the camera MPU 101 transmits a variety of information (including auto bounce information) about the camera 100 to the external flash device 120, and receives a variety of information (including auto bounce information) about the external flash device 120 from the external flash device 120.

FIG. 4A is a view showing the auto bounce information transmitted to the external flash device 120 from the camera 100 in the step S305. This auto bounce information is information about the auto bounce control containing an "auto bounce start command", an "auto bounce stop command", and "auto-bounce start switch information".

The "auto bounce start command" instructs the start of the auto bounce control. The "auto bounce stop command" instructs the stop of the auto bounce control. The "auto-bounce start switch information" indicates the switch that is operated to start the auto bounce control, and indicates the switch SW1 or SWAB.

FIG. 4B is a view showing the auto bounce information transmitted to the camera 100 from the external flash device in the step S305. This auto bounce information is information about the auto bounce control containing an "auto bounce start", an "auto bounce end", an "auto bounce in operation", and "auto-bounce start switch information". The "auto bounce start" notifies that the auto bounce control has started.

An "auto bounce end" notifies that the auto bounce control has finished. The "auto bounce in operation" notifies that the auto bounce control is in operation. The "information about auto bounce start switch" indicates that the switch ST_SWAB that is the auto bounce start switch of the external flash device 120 was pressed.

The description returns to FIG. 3. In step S306 after the step S305, the camera MPU 101 performs an auto bounce determination process. In this auto bounce determination process, it is determined which of the switches SW1, SWAB, and ST_SWAB was used to permit start of the auto bounce control. Details of this process will be described later with reference to FIG. 5. Next, in step S307, the camera MPU 101 determines whether the switch SW1, which is used for starting the photometry and AF that are contained in a photographing-preparation process, is OFF. When the switch SW1 is OFF (YES in the step S307), the camera MPU 101 proceeds with the process to step S308. On the other hand, when the switch SW1 is ON (NO in the step S307), the process proceeds to step S313.

In the step S308, the camera MPU 101 determines whether the auto bounce permission was given with the switch SWAB on the basis of the result of the auto bounce determination process in the step S306. When the auto bounce permission was given with the switch SWAB (YES in the step S308), the camera MPU 101 proceeds with the process to step S309. On the other hand, when the auto bounce permission was not given with the switch SWAB (NO in the step S308), the process proceeds to step S310.

In the step S309, the camera MPU 101 sets a flag "SWAB_AutoBounce" to "1". It should be noted that the flag "SWAB_AutoBounce" is stored in a memory (RAM etc.). Then, the process proceeds to step S312.

In the step S310, the camera MPU 101 determines whether the auto bounce permission was given with the switch ST_SWAB on the basis of the result of the auto bounce determination process in the step S306. When the auto bounce permission was given with the switch ST_SWAB (YES in the step S310), the camera MPU 101 proceeds with the process to step S311. On the other hand, when the auto bounce permission was not given with the switch ST_SWAB (NO in the step S310), the process proceeds to step S302.

In the step S311, the camera MPU 101 sets a flag "ST_SWAB_AutoBounce" to "1". It should be noted that the flag "ST_SWAB_AutoBounce" is stored in a memory (RAM etc.). Then, the process proceeds to the step S312. In the step S312, the camera MPU 101 communicates with the external flash device 120 about the auto bounce control start. Then, the process returns back to the step S302.

When it is determined that the switch SW1 is ON in the step S307 (NO in the step S307), the camera MPU 101 performs a focusing calculation in the well-known phase difference detection method on the basis of the defocus amount detected by the focus detection unit 115 in order to focus on a subject in step S313. In the following step S314, the camera MPU 101 computes the lens drive amount for focusing on the basis of the data based on the focusing calculation in the step S313, and drives the lens.

Then, in step S315, the camera MPU 101 performs the photometry arithmetic process for determining the shutter speed (or storage time in a case using a CMOS sensor), an aperture value, etc. on the basis of camera setting information including the output from the photometry unit 112 and a photographing mode.

In step S316, the camera MPU 101 determines whether the auto bounce permission was given with the switch SW1 on the basis of the result of the auto bounce determination process in the step S306. When the auto bounce permission was given with the switch SW1 (YES in the step S316), the camera MPU 101 proceeds with the process to step S317.

On the other hand, when the auto bounce permission was not given by the switch SW1 (NO in the step S316), the process proceeds to step S319.

In the step S317, the camera MPU 101 sets a flag "SW1_AutoBounce" to "1". It should be noted that the flag "SW1_AutoBounce" is stored in a memory (RAM etc.). In the following step S318, the camera MPU 101 communicates with the external flash device 120 about the auto bounce control start. Then, the process proceeds to step S319.

In step S319, the camera MPU 101 displays the information about the camera, such as the shutter speed and the aperture value that were computed by performing the photometry arithmetic, on the image display unit 107. In the next step S320, the camera MPU 101 determines whether the switch SW2 as the release switch is turned ON. When the switch SW1 is turned ON (YES in the step S320), the camera MPU 101 proceeds with the process to step S321. On the other hand, when the switch SW1 is not turned ON (NO in the step S320), the process returns back to the step S302.

In the step S321, the camera MPU 101 performs a series of actions for static image photographing, such as a gain setting for the image pickup device 103, an accumulation operation, a read operation, an image process for the read signals, and an image writing operation. The process returns to the step S302 after executing the process in the step S321.

Figure 5:
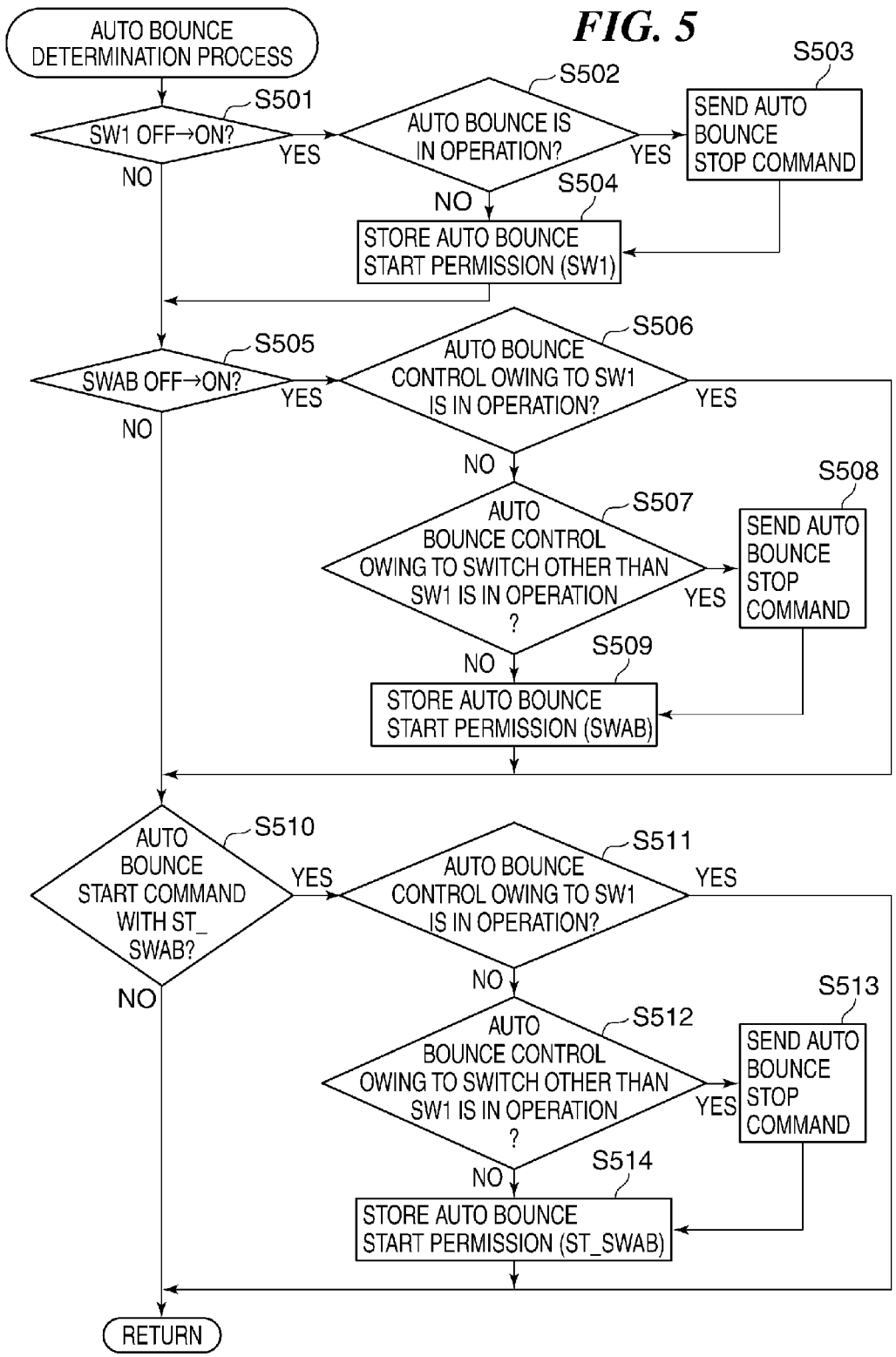
FIG. 5 is a flowchart showing an auto bounce determination process executed in the step S306 in FIG. 3.

Next, the auto bounce determination process in the step S306 will be described. FIG. 5 is a flowchart showing the auto bounce determination process executed in the step S306. In step S501, the camera MPU 101 determines whether the switch SW1 changed from OFF to ON.

When the switch SW1 turns ON (YES in the step S501), the camera MPU 101 proceeds with the process to step S502. On the other hand, when the switch SW1 remains OFF (NO in the step S501), the process proceeds to step S505.

In the step S502, the camera MPU 101 determines whether the external flash device 120 is in operation of the auto bounce control on the basis of the auto bounce information received by the flash communication in the step S305. When the auto bounce control is performing (YES in the step S502), the camera MPU 101 proceeds with the process to step S503. On the other hand, when the auto bounce control is not performing (NO in the step S503), the process proceeds to step S504.

In the step S503, the camera MPU 101 sends the auto bounce stop command to the external flash device 120. Then, the process proceeds to step S504. In the step S504, the camera MPU 101 stores that the start permission of the auto bounce control is given with the switch SW1. Then, the process proceeds to step S505.

In the step S505, the camera MPU 101 determines whether the switch SWAB changed from OFF to ON. When the switch SWAB is turned ON (YES in the step S505), the camera MPU 101 proceeds with the process to step S506. On the other hand, when the switch SWAB is not turned ON (NO in the step S505), the process proceeds to step S510. In the step S506, the camera MPU 101 determines whether the auto bounce control owing to the switch SW1 is in operation (whether the auto bounce control in operation was started with the switch SW1). When the auto bounce control owing to the switch SW1 is in operation (YES in the step S506), the camera MPU 101 proceeds with the process to step S510. On the other hand, when the auto bounce control owing to the switch SW1 is not in operation (NO in the step S506), the process proceeds to step S507. It should be noted that the camera MPU 101 determines whether the auto bounce control owing to the switch SW1 is in operation on the basis of the value of the flag "SW1_AutoBounce" set in the step S317 and the auto bounce information on the external flash device 120.

In the step S507, the camera MPU 101 determines whether the auto bounce control owing to a switch other than the switch SW1 is in operation. It should be noted that a switch other than the switch SW1 is the switch SWAB or the switch ST_SWAB specifically, and the values of the flags "SWAB_AutoBounce" and "ST_SWAB_AutoBounce" set in the steps S309 and S311 are used in the determination in the step S507.

When the auto bounce control owing to a switch other than the switch SW1 is in operation (YES in the step S507), the camera MPU 101 proceeds with the process to step S508. Moreover, when the auto bounce control owing to a switch other than the switch SW1 is not in operation (NO in the step S507), the camera MPU 101 proceeds with the process to step S509.

In the step S508, the camera MPU 101 sends the auto bounce stop command to the external flash device 120. Then, the process proceeds to the step S509. In the step S509, the camera MPU 101 stores that the start permission of the auto bounce control is given with the switch SWAB. Then, the process proceeds to step S510.

In the step S510, the camera MPU 101 determines whether the auto bounce start command with the switch ST_SWAB is included in the auto bounce information from the external flash device 120. When the auto bounce start command with the switch ST_SWAB is not included (NO in the S510), the camera MPU 101 finishes this process. On the other hand, when the auto bounce start command with the switch ST_SWAB is included (YES in the step S510), the process proceeds to step S511.

In the step S511, the camera MPU 101 determines whether the auto bounce control owing to the switch SW1 is in operation. When the auto bounce control owing to the switch SW1 is in operation (YES in the S511), the camera MPU 101 finishes this process. On the other hand, when the auto bounce control owing to the switch SW1 is not in operation (NO in the step S511), the process proceeds to step S512.

In the step S512, the camera MPU 101 determines whether the auto bounce control owing to a switch other than the switch SW1 is in operation. It should be noted that a switch other than the switch SW1 is the switch SWAB or the switch ST_SWAB specifically.

When the auto bounce control owing to a switch other than the switch SW1 is in operation (YES in the step S512), the camera MPU 101 proceeds with the process to step S513. On the other hand, when the auto bounce control owing to a switch other than the switch SW1 is not in operation (NO in the step S512), the camera MPU 101 proceeds with the process to step S514.

In the step S513, the camera MPU 101 sends the auto bounce stop command to the external flash device 120. Then, the process proceeds to the step S514. In the step S514, the camera MPU 101 stores that the start permission of the auto bounce control is given with the switch ST_SWAB. Then, this process is finished.

As mentioned above, the camera 100 instructs start and stop of the auto bounce control to the external flash device 120 in this embodiment. The auto bounce control owing to the switch SW1 has a priority over the auto bounce control owing to the switch SWAB or ST_SWAB. It should be noted that the auto bounce control owing to the switch SWAB or the switch ST_SWAB will be changed to the auto bounce control owing to the switch ST_SWAB or the switch SWAB that is pressed later in time.

Figure 6:
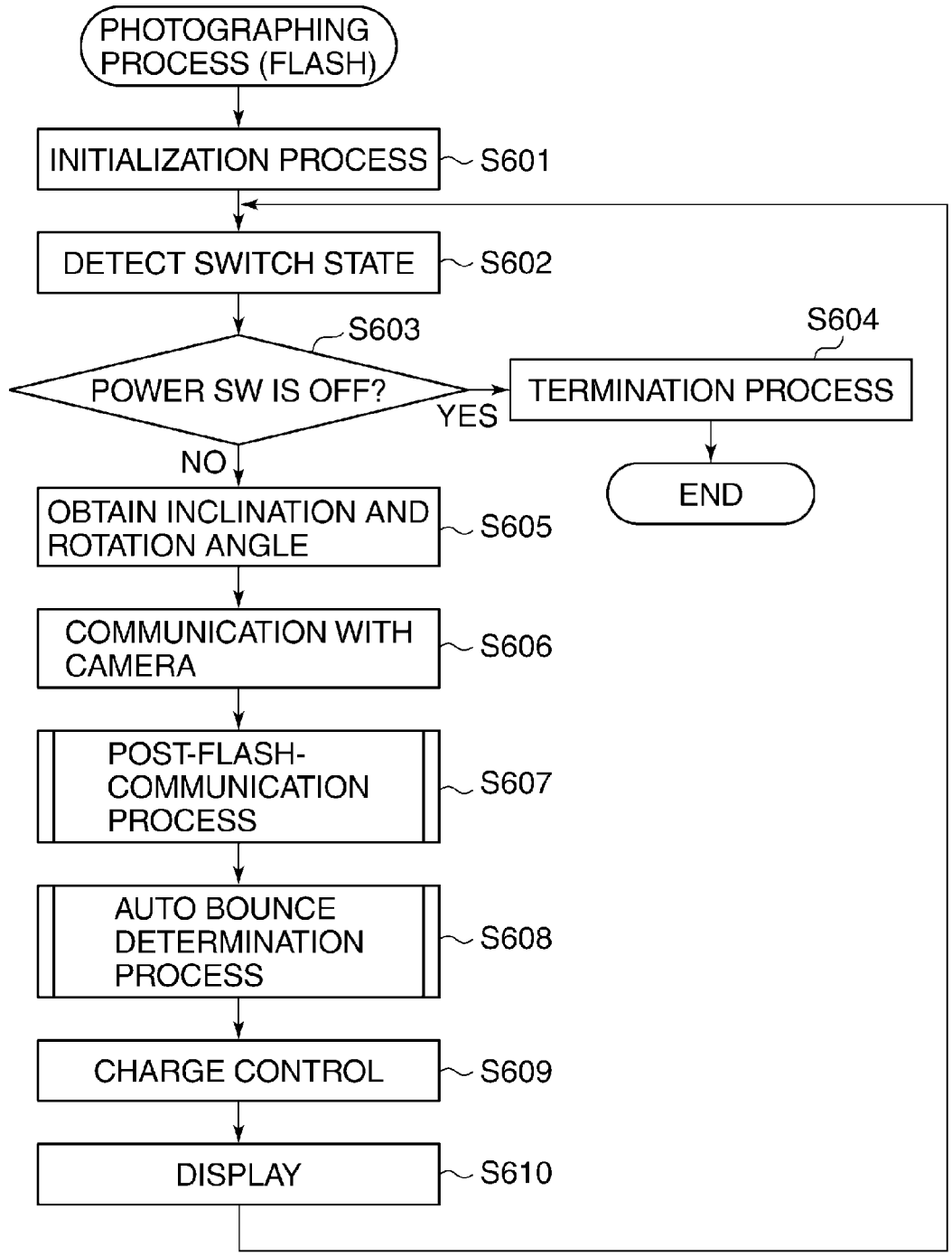
FIG. 6 is a flowchart showing a photographing process executed by the external flash device shown in FIG. 2 in the image pickup system according to the first embodiment.

FIG. 6 is a flowchart showing a photographing process executed by the external flash device 120 in the image pickup system according to the first embodiment. The process shown in FIG. 6 is executed by the flash MPU 201 by expanding a control program stored in a ROM (not shown) to a RAM (not shown).

In step S601, the flash MPU 201 performs an initialization process for various terminals connected to the flash MPU 201, and a data initialization process for a built-in RAM of the flash MPU 201. Moreover, if the flash head 200b is not directed in the optical axis direction as an initial position, it returns to the initial position. In the following step S602, the flash MPU 201 detects the states of the switch ST_SWAB and the other switches with which the flash switch operation unit 207 is provided.

In step S603, the flash MPU 201 determines whether the power switch (power SW) of the external flash device 120 is OFF on the basis of the switch detection result in the step S602. When the power SW is OFF (YES in the step S603), the flash MPU 201 proceeds the process to step S604. On the other hand, when the power SW is ON (NO in the step S603), the process proceeds to step S605. In the step S604, the flash MPU 201 performs a termination setting like a power OFF process etc., and terminates this process.

In step S605, the flash MPU 201 obtains an inclination and a rotation angle of the flash body 200a from the flash orientation detection unit 205. In the following step S606, the flash MPU 201 executes a communication process (corresponding to the communication process in the step S305) with the camera 100.

In the next step S607, the flash MPU 201 performs a post-flash-communication process. Furthermore, the camera MPU 101 performs an auto bounce determination process in step S608. The details of the post-flash-communication process in the steps S607 and the auto bounce determination process in the step S608 will be mentioned later.

In step S609, the flash MPU 201 performs a charge control, such as charging start and charging stop, for a capacitor (not shown) in the flash body 200a. Then, the flash MPU 201 displays various states (a flash mode, a charge state, a zoom position, etc.) of the external flash device 120 on the display unit 208 in step S610. Then, the process returns back to the step S602.

Figure 7:
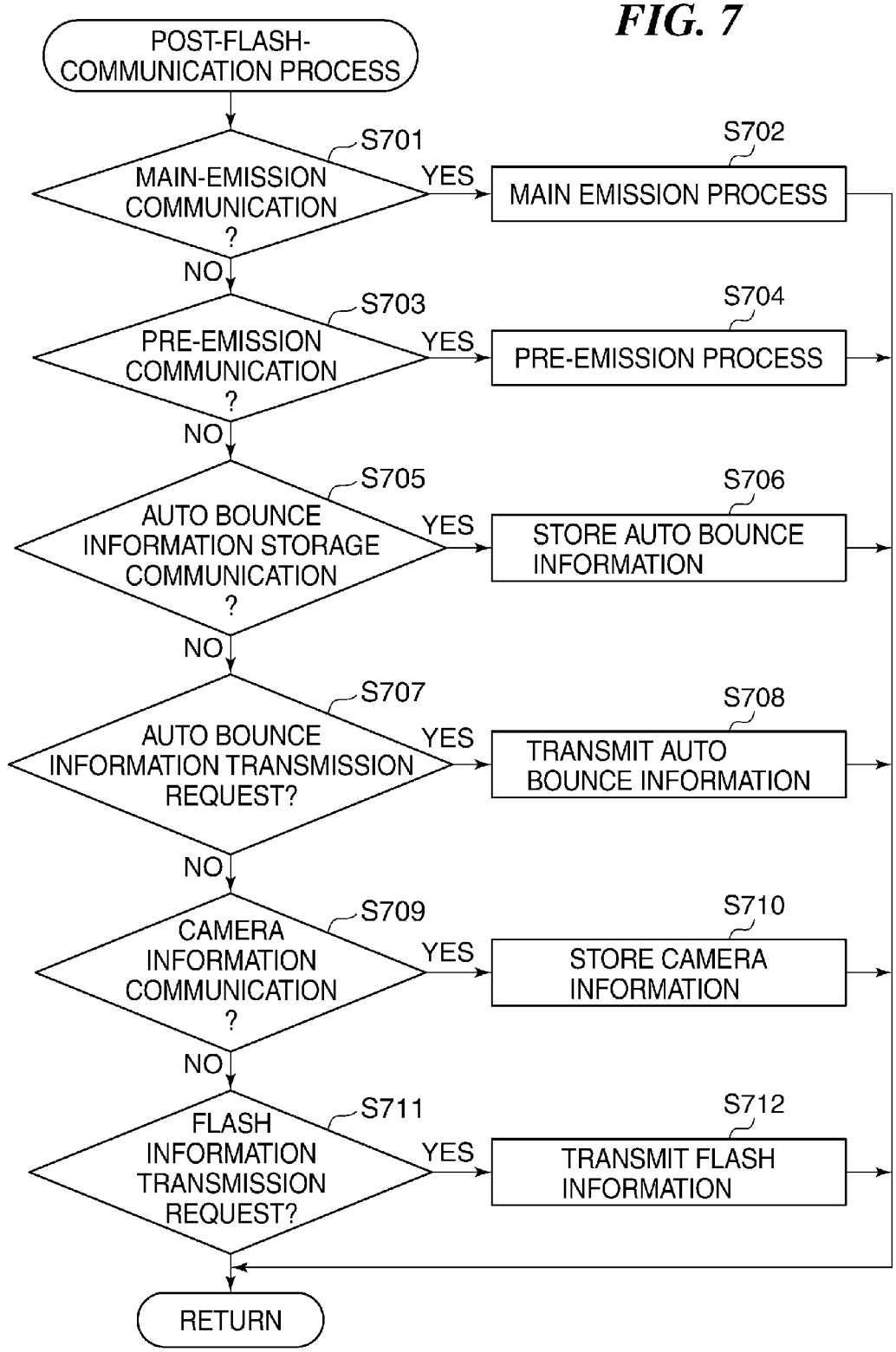
FIG. 7 is a flowchart showing a post-flash-communication process executed in the step S607 in FIG. 6.

Details of the post-flash-communication process in the step S607 mentioned above will be described with reference to FIG. 7. FIG. 7 is a flowchart showing a post-flash-communication process executed in the step S607. In step S701, the flash MPU 201 determines whether the communication from the camera 100 is a main-emission communication that instructs a main emission.

When it is the main-emission communication (YES in the step S701), the flash MPU 201 performs a main-emission process in step S702. Then, this process is finished. When it is not the main-emission communication (NO in the step S701), the flash MPU 201 determines whether the communication from the camera 100 is a pre-emission communication that instructs a pre-emission in step S703.

When it is the pre-emission communication (YES in the step S703), the flash MPU 201 performs a pre-emission process in step S704. Then, this process is finished. When it is not the pre-emission communication (NO in the step S703), the flash MPU 201 determines whether the communication from the camera 100 is an auto bounce information storage communication in step S705. When it is the auto bounce information storage communication (YES in the step S705), the flash MPU 201 obtains and stores the auto bounce information (FIG. 4A) from the camera 100 in step S706. Then, this process is finished. When it is not the auto bounce information storage communication (NO in the step S705), the flash MPU 201 determines whether the communication from the camera 100 is an auto bounce information transmission request in step S707.

When it is the auto bounce information transmission request (YES in the step S707), the flash MPU 201 transmits the auto bounce information (FIG. 4B) to the camera 100 in step S708. Then, this process is finished. When it is not the auto bounce information transmission request (NO in the step S707), the flash MPU 201 determines whether the communication from the camera 100 is a camera information communication in step S709.

When it is the camera information communication (YES in the step S709), the flash MPU 201 stores the camera information (the photographing mode, shutter speed, aperture value, zoom position, pre-emission information, etc.) in step S710. Then, this process is finished. When it is not the camera information communication (NO in the step S709), the flash MPU 201 determines whether the communication from the camera 100 is a flash information transmission request in step S711.

When it is the flash information transmission request (YES in the step S711), the flash MPU 201 transmits the flash information (the flash mode, charge state, battery voltage, guide number, etc.) to the camera 100 in step S712. Then, this process is finished. Moreover, when it is not the flash information transmission request (NO in the step S711), the flash MPU 201 finishes this process. It should be noted that the order of the steps S701, S703, S705, S707, S709, and S711 in the post-flash-communication process is not limited to the above-mentioned order, and can be set freely.

Figure 8:
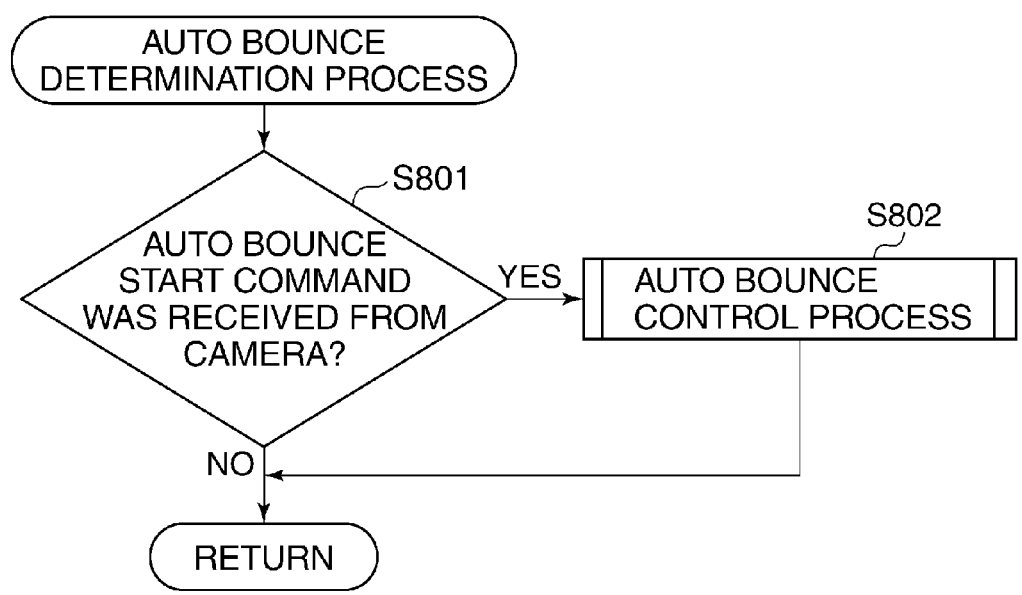
FIG. 8 is a flowchart showing an auto bounce determination process executed in the step S608 in FIG. 6.

Details of the auto bounce determination process in the step S608 mentioned above will be described with reference to FIG. 8. FIG. 8 is a flowchart showing the auto bounce determination process executed in the step S608. In step S801, the flash MPU 201 determines whether the auto bounce start command was received from the camera MPU 101. When the auto bounce start command was received (YES in the step S801), the flash MPU 201 executes an auto bounce control process in step S802. When the auto bounce start command was not received (NO in the step S801), this process is finished.

Figure 9:
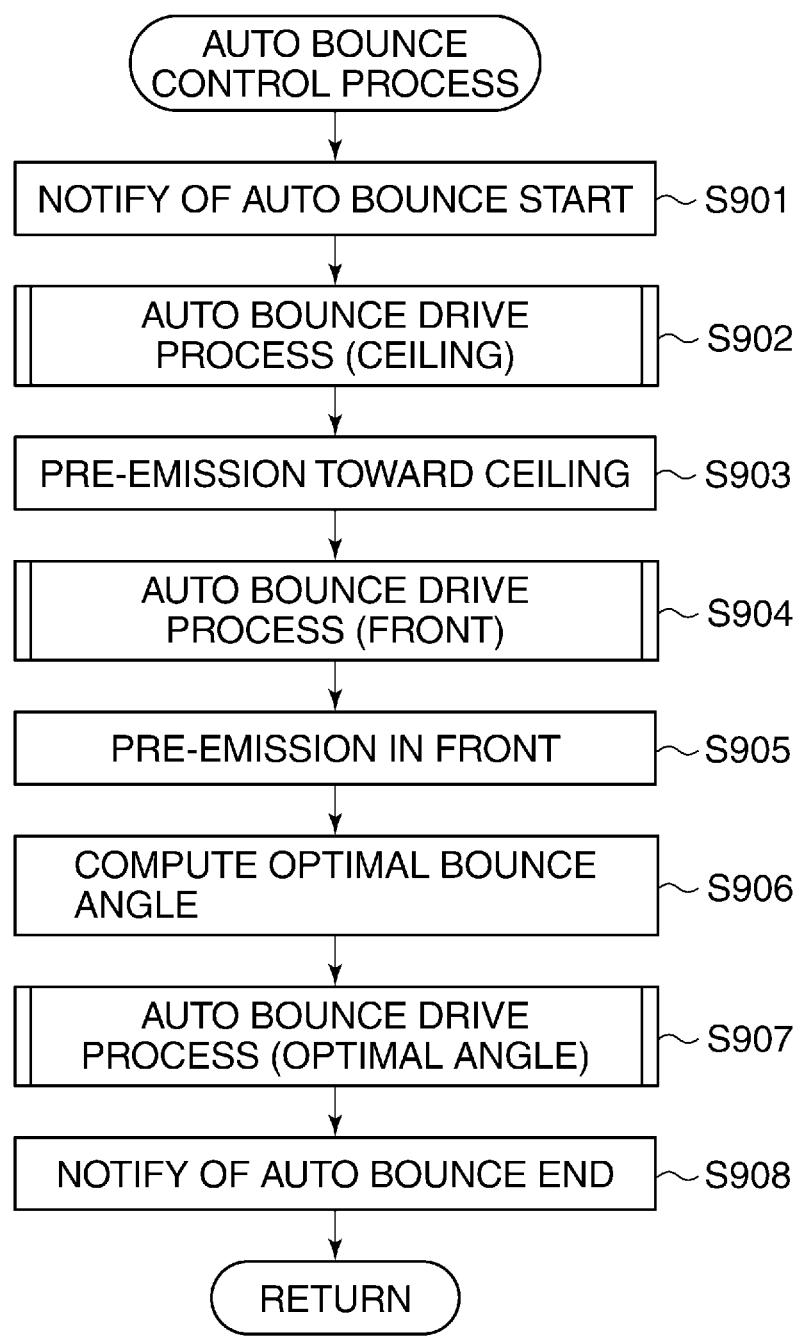
FIG. 9 is a flowchart showing an auto bounce control process executed in the steps S802 in FIG. 8.

Details of the auto bounce control process in the step S802 mentioned above will be described with reference to FIG. 9. FIG. 9 is a flowchart showing the auto bounce control process executed in the step S802. First, the flash MPU 201 notifies the camera MPU 101 of the auto bounce start in step S901.

In the following step S902, the flash MPU 201 performs an auto bounce drive process for driving the flash head 200b so as to be directed to a ceiling. Here, the drive amount of the flash head 200b to the ceiling direction is computed on the basis of the inclination of the flash body 200a. For example, when the inclination detected in the step S605 in FIG. 6 shall be X degrees and the rotation angle shall be 0 degrees, the drive amount in the vertical direction becomes (90−X) degrees, and the drive amount in the horizontal direction becomes 0 degrees. It should be noted that details of the process in the step S902 will be described later.

In step S903, the flash MPU 201 performs the pre-emission with the light emitting section 202 in the ceiling direction. The light emitting section 202 emits a flash light at the time of the pre-emission. The ranging photometry unit 203 receives the reflected light from the ceiling as a ranging target, and computes a distance to the ceiling.

In the next step S904, the flash MPU 201 performs the auto bounce drive process for driving the flash head 200b so as to face to a photography subject in front. The drive amount becomes—(90−X) degrees. It should be noted that details of the process in the step S904 will be described later.

In step S905, the flash MPU 201 performs the pre-emission. The light emitting section 202 emits a flash light at the time of the pre-emission. The ranging photometry unit 203 receives the reflected light from the subject as a ranging target, and computes a distance to the subject.

In step S906, the flash MPU 201 computes the optimal bounce angle corresponding to an irradiation direction suitable for a bounce flash photography on the basis of the distance to the ceiling, the distance to the subject, the inclination and rotation angle of the flash body 200a. Since the optimal bounce angle is computed using a well-known technique, a detailed description thereof is omitted.

In the following step S907, the flash MPU 201 performs the auto bounce drive process for driving the flash head 200b so as to be in the optimal bounce angle. It should be noted that details of the process in the step S907 will be described later. Then, the camera MPU 101 notifies the camera 100 of the auto bounce end in step S908. Then, this process is finished.

Figure 10:
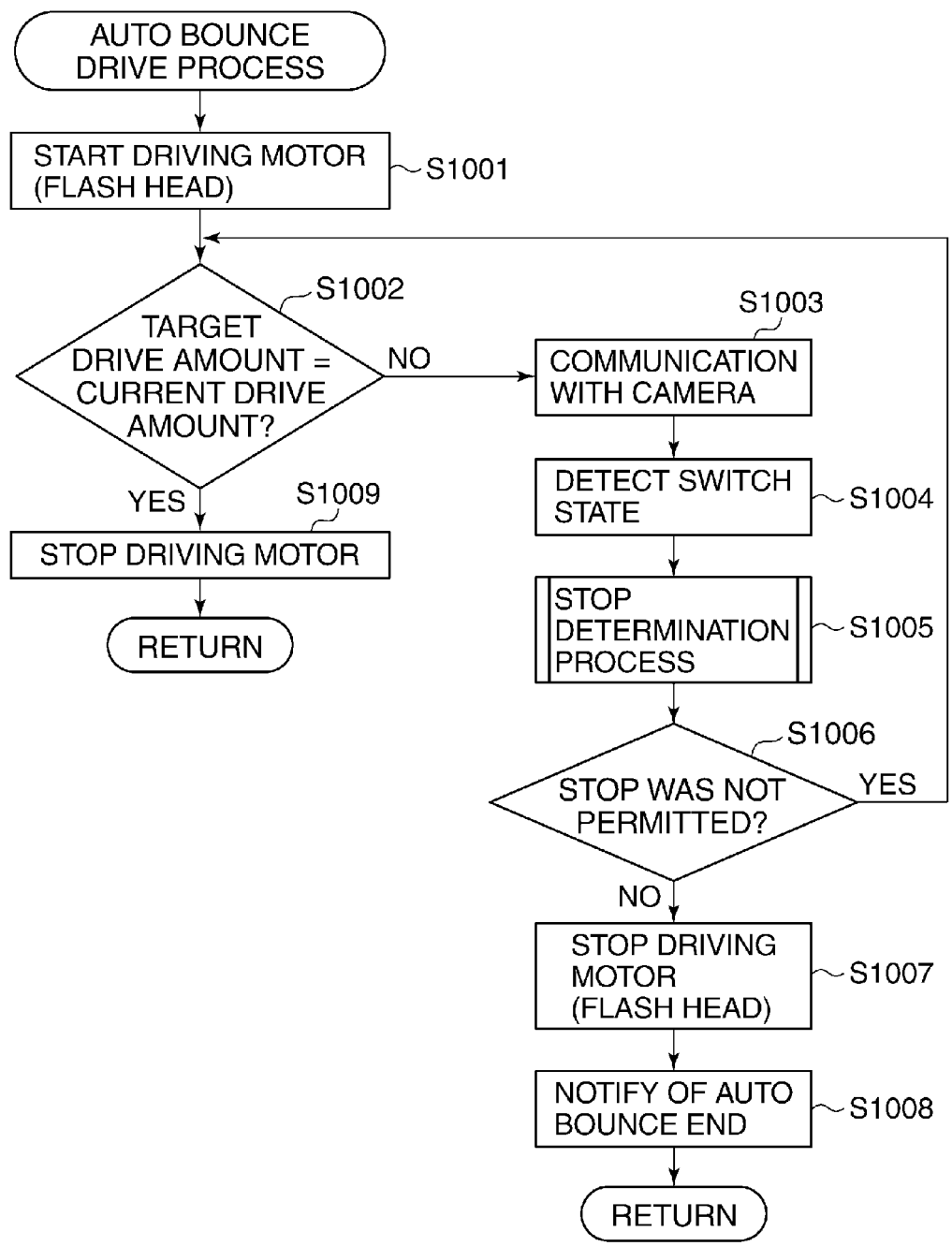
FIG. 10 is a flowchart showing an auto bounce drive process executed in the steps S902, S904, and S907 in FIG. 9.

Details of the auto bounce drive process in the steps S902, S904, and S907 mentioned above will be described with reference to FIG. 10. FIG. 10 is a flowchart showing the auto bounce drive process executed in the steps S902, S904, and S907. Since the bounce drive processes in the steps S902, S904, and S907 have the same procedures except the drive amount, they can be described with one flowchart shown in FIG. 10.

First, in step S1001, the flash MPU 201 controls the head drive control unit 204 to drive a motor (not shown), and starts the drive of the flash head 200b.

In the following step S1002, the flash MPU 201 obtains the drive amount in the current position of the flash head 200b from the head drive control unit 204, and determines whether the current drive amount obtained agrees with a target drive amount.

When the current drive amount agrees with the target drive amount (YES in the step S1002), the flash MPU 201 proceeds with the process to step S1009. When the current drive amount does not agree with the target drive amount (NO in the step S1002), the process proceeds to step S1003.

In the step S1009, the flash MPU 201 controls the bounce drive control unit 204 to stop the motor (not shown) to stop driving the flash head 200. Then, this process is finished. On the other hand, the flash MPU 201 communicates with the camera MPU 101 to obtain the auto bounce information in the step S1003.

In step S1004, the flash MPU 201 detects the status of the various switches (the power SW, switch ST_SWAB, etc.) of the flash switch operation unit 207. Then, the flash MPU 101 performs an auto-bounce stop determination process in step S1005. Details of the auto-bounce stop determination process will be later mentioned with reference to FIG. 11.

In the next step S1006, the flash MPU 201 determines whether the stop of the auto bounce control was not permitted as a result of the stop determination process in the step S1005. When the stop of the auto bounce control was not permitted (YES in the step S1006), the camera MPU 101 returns the process back to the step S1002. On the other hand, when the stop of the auto bounce control was permitted (NO in the step S1006), the process proceeds to step S1007.

In the step S1007, the flash MPU 201 controls the head drive control unit 204 to stop the motor (not shown), and stops driving the flash head 200b. Next, the camera MPU 101 notifies the camera 100 of the auto bounce end in step S1008. Then, this process is finished.

Figure 11:
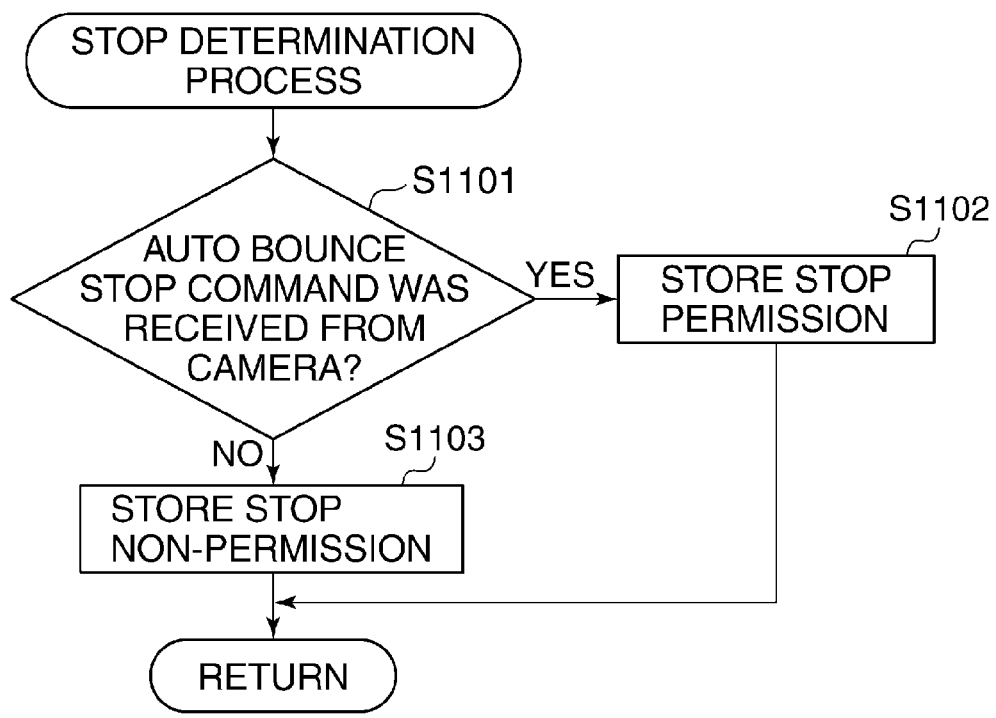
FIG. 11 is a flowchart showing an auto-bounce stop determination process executed in the step S1005 in FIG. 10.

Details of the auto-bounce stop determination process in the step S1005 mentioned above will be described with reference to FIG. 11. FIG. 11 is a flowchart showing the auto-bounce stop determination process executed in the step S1005.

In step S1101, the flash MPU 201 determines whether the auto bounce stop command is included in the auto bounce information received from the camera MPU 101. When the auto bounce stop command is included (YES in the step S1101), the flash MPU 201 proceeds with the process to step S1102. On the other hand, when the auto bounce stop command is not included (NO in the step S1101), the process proceeds to step S1103.

In the step S1102, the flash MPU 201 stores the stop permission of the auto bounce into a memory. On the other hand, in the step S1103, the flash MPU 201 stores the stop non-permission of the auto bounce into the memory. After executing the step S1102 or the step S1103, this process is finished.

As mentioned above, the stop of the auto bounce control is permitted when the switch SW1 turns ON from OFF again during the auto bounce control started with the switch SW1, SWAB, or ST_SWAB. On the other hand, the stop of the auto bounce control is not permitted when the switch SWAB or ST_SWAB turns ON from OFF during the auto bounce control started with the switch SW1.

Furthermore, the stop of the auto bounce control is permitted when the switch SWAB or ST_SWAB turns ON from OFF during the auto bounce control started with the switch SWAB or ST_SWAB. Thus, priority is given to the auto bounce control owing to the switch SW1 of the camera 100 in this embodiment.

When the switch SW1 is turned ON, photographing preparation operations, such as AF and photometry, also start. Therefore, the auto bounce control started with the switch SW1 has a higher possibility to be performed just before starting photography than the auto bounce control started with another switch. Accordingly, a possibility that the irradiation direction suitable for the bounce flash photography varies significantly in a period from starting the auto bounce control with the switch SW1 until photographing is lower than that in a period from starting the auto bounce control with another switch until photographing.

Moreover, when the irradiation direction suitable for the bounce flash photography varies significantly in a period from starting the auto bounce control with the switch SW1 until photographing, there is a high possibility that the switch SW1 is turned ON again because a significant composition change or movement of a subject is assumed. From the above reasons, the auto bounce control owing to the switch SW1 has the priority over the auto bounce control with another switch. This reduces unnecessary auto bounce controls, and allows to perform suitable auto bounce controls while reducing release time lag.

Next, an auto bounce control method in the image pickup system according to a second embodiment of the present invention will be described. The configuration of the camera 100 (FIG. 1), the configuration of the external flash device 120 (FIG. 2), the photographing process of the camera 100

(FIG. 3), the auto bounce communication information (FIG. 4), and the auto bounce determination process (FIG. 5) are applied to the second embodiment as-is. Moreover, the photographing process of the external flash device 120 described with reference to FIG. 6 in the first embodiment is also applied to the second embodiment as-is.

However, the contents of the auto bounce determination process in the step S608 in the second embodiment differ from the contents of the auto bounce determination process in the step S608 in the first embodiment. The contents of the auto bounce determination process in the step S608 in the second embodiment will be described with reference to FIG. 12.

Figure 12:
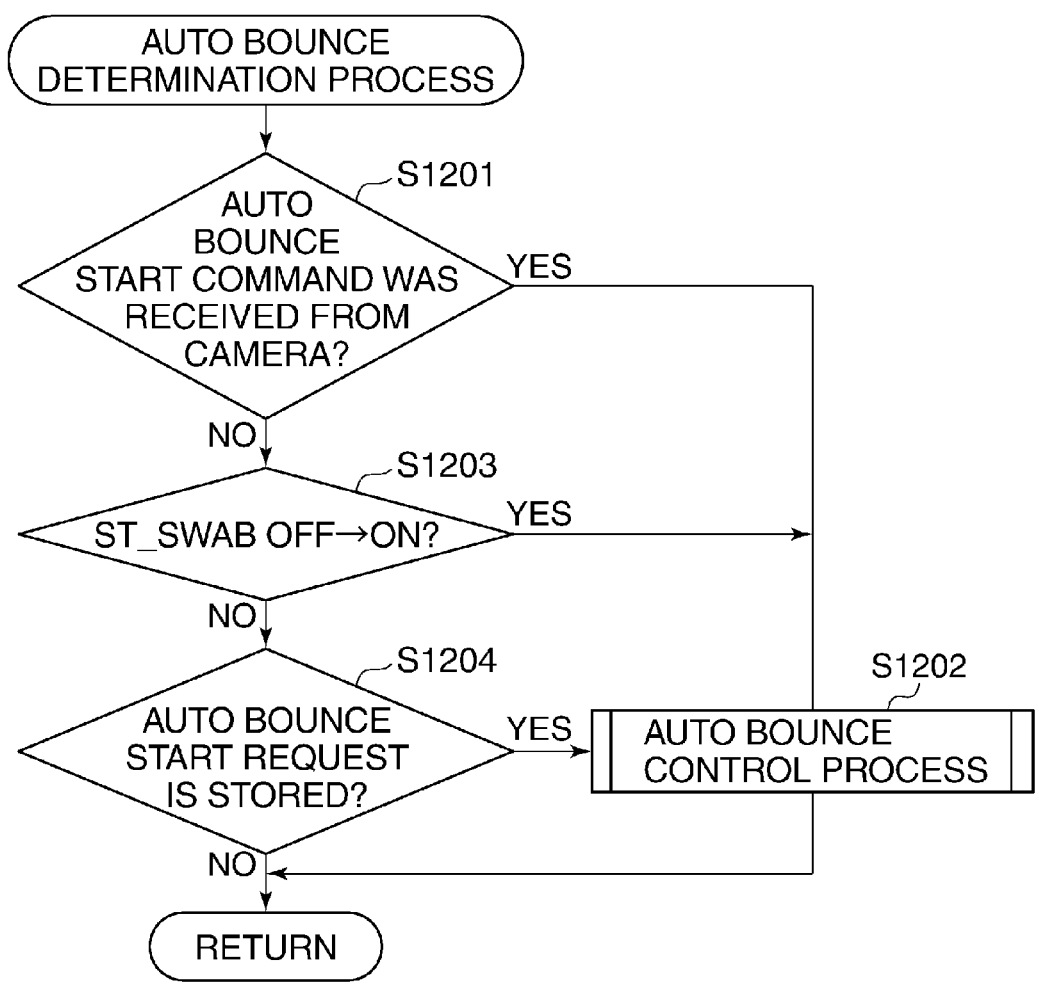
FIG. 12 is a flowchart showing an auto bounce determination process executed in the step S608 in FIG. 6 in the photographing process by the external flash device in the image pickup system according to a second embodiment.

FIG. 12 is a flowchart showing the auto bounce determination process executed in the step S608 in FIG. 6 in the photographing process by the external flash device 120 in the image pickup system according to the second embodiment. In step S1201, the flash MPU 201 determines whether the auto bounce start command was received from the camera MPU 101. When the auto bounce start command was received (YES in the step S1201), the flash MPU 201 proceeds with the process to step S1202. On the other hand, when the auto bounce start command was not received (NO in the step S1201), the process proceeds to step S1203.

In the step S1203, the flash MPU 201 determines whether the switch ST_SWAB was turned ON from OFF (whether the auto bounce start button was pressed) on the basis of the result of the switch detection in the step S602 in FIG. 6. When the switch ST_SWAB was turned ON (YES in the step S1203), the flash MPU 201 proceeds with the process to the step S1202. On the other hand, when the switch ST_SWAB was not turned ON (NO in the step S1203), the process proceeds to step S1204.

In the step S1204, the flash MPU 201 determines whether an auto bounce start request is stored according to a process in FIG. 13 mentioned below. When the auto bounce start request is stored (YES in the step S1204), the flash MPU 201 proceeds with the process to the step S1202. On the other hand, when no auto bounce start request is stored (NO in the step S1204), this process is finished. In the step S1202, the flash MPU 201 executes the auto bounce control, and then, finishes this process.

Since the contents of the auto bounce control in the step S1202 are the same as that of the auto bounce control described with reference to the flowchart in FIG. 9 in the first embodiment, the description is omitted. Moreover, since the contents of the bounce drive control in the steps S902, S904, and S907 in the flowchart in FIG. 9 are the same as the contents of the auto bounce control described with reference to the flowchart in FIG. 10 in the first embodiment, the description is omitted.

However, the contents of the auto-bounce stop determination process in the step S1005 in the second embodiment differ from the contents of the auto-bounce stop determination process in the step S1005 in the first embodiment. The contents of the auto-bounce stop determination process in the step S1005 in the second embodiment will be described with reference to FIG. 13.

Figure 13:
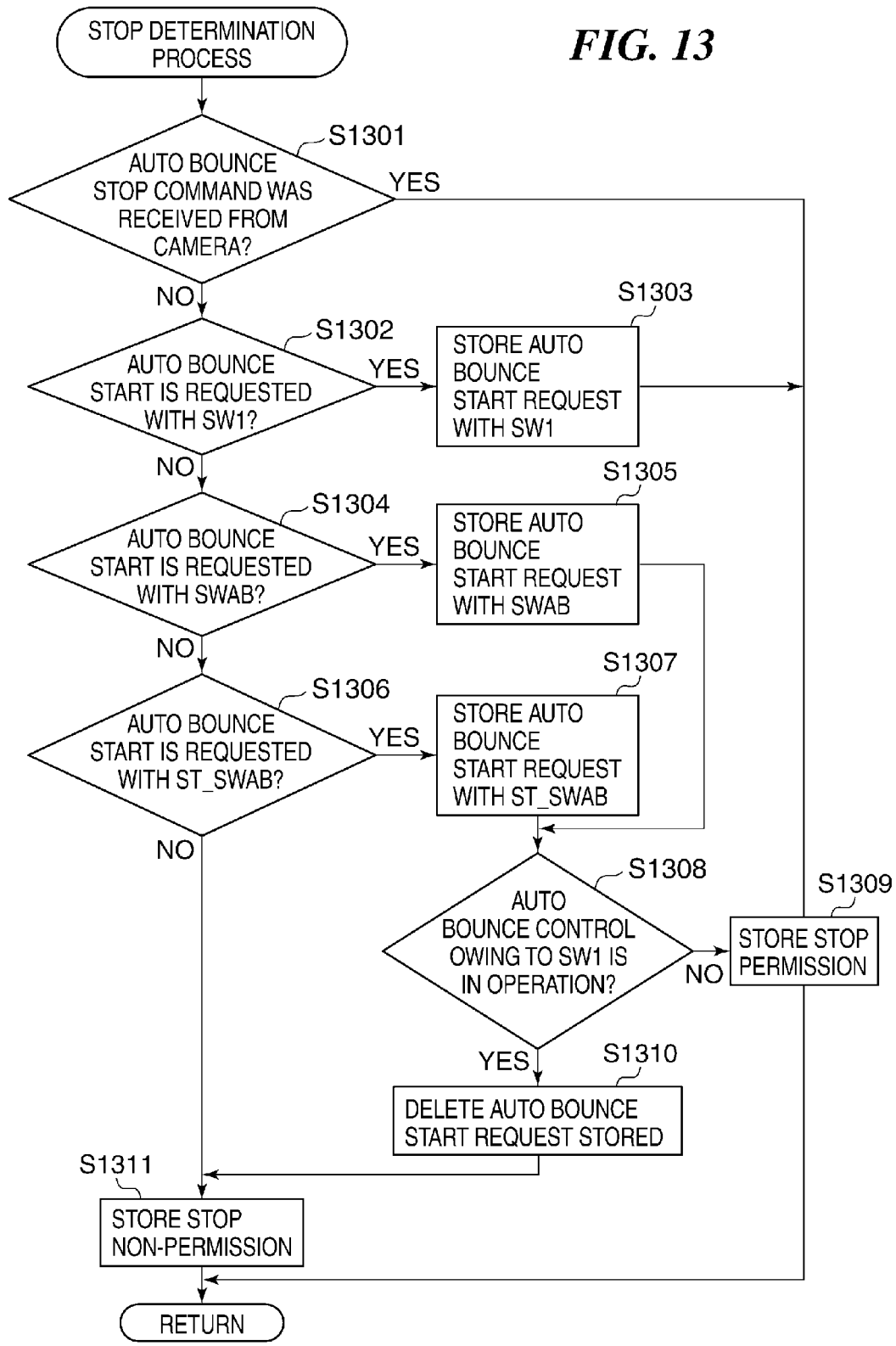
FIG. 13 is a flowchart showing an auto-bounce stop determination process executed in the step S1005 in FIG. 10 in the auto bounce drive process by the external flash device in the image pickup system according to the second embodiment.

FIG. 13 is a flowchart showing the auto-bounce stop determination process executed in the step S1005 in FIG. 10 in the auto bounce drive process by the external flash device 120 in the image pickup system according to the second embodiment.

In step S1301, the flash MPU 201 determines whether the auto bounce stop command is included in the auto bounce information received from the camera MPU 101. When the auto bounce stop command is included (YES in the step S1301), the flash MPU 201 proceeds with the process to step S1309, stores stop permission of the auto bounce in the memory like a RAM, and finishes this process. On the other hand, when the auto bounce stop command is not included (NO in the step S1301), the process proceeds to step S1302.

In the step S1302, the flash MPU 201 determines whether the auto-bounce start switch information indicates the switch SW1 (whether auto bounce start is requested with the switch SW1) on the basis of the auto bounce information from the camera 100. When there is the auto bounce start is requested with the switch SW1 (YES in the step S1302), the flash MPU 201 proceeds with the process to step S1303. On the other hand, when the auto bounce start is not requested with the switch SW1 (NO in the step S1302), the flash MPU 201 proceeds with the process to step S1304.

In the step S1303, the flash MPU 201 stores the auto bounce start request with the switch SW1 into the memory like a RAM. Then, the process proceeds to the step S1309.

On the other hand, in the step S1304, the flash MPU 201 determines whether the auto-bounce start switch information indicates the switch SWAB (whether auto bounce start is requested with the switch SWAB) on the basis of the auto bounce information from the camera 100. When the auto bounce start is requested with the switch SWAB (YES in the step S1304), the flash MPU 201 proceeds with the process to step S1305. On the other hand, when the auto bounce start is not requested with the switch SWAB (NO in the step S1304), the flash MPU 201 proceeds with the process to step S1306.

In the step S1305, the flash MPU 201 stores the auto bounce start request with the switch SWAB into the memory like a RAM. Then, the process proceeds to the step S1308. On the other hand, in the step S1306, the flash MPU 201 determines whether the switch ST_SWAB (the auto bounce start button) was turned ON from OFF (whether auto bounce start is requested with the switch ST_SWAB) on the basis of the result of the switch detection in the step S602 in FIG. 6.

When the auto bounce start is requested with the switch ST_SWAB (YES in the step S1306), the flash MPU 201 proceeds with the process to step S1307. On the other hand, when an auto bounce start is not requested with the switch ST_SWAB (NO in the step S1306), the flash MPU 201 proceeds with the process to step S1311.

In the step S1307, the flash MPU 201 stores the auto bounce start request with the switch ST_SWAB into the memory like a RAM. Then, the process proceeds to the step S1308. In the step S1308, the flash MPU 201 determines whether the auto bounce control in operation was started with the switch SW1. When the auto bounce control owing to the switch SW1 is in operation (YES in the step S1308), the flash MPU 201 proceeds with the process to step S1310. On the other hand, when the auto bounce control owing to the switch SW1 is not in operation (NO in the step S1308), the flash MPU 201 proceeds with the process to the step S1309.

In step S1310, the flash MPU 201 deletes the auto bounce start request stored in the memory like a RAM.

Then, the process proceeds to the in the step S1311. The flash MPU 201 stores stop non-permission of the auto bounce control into the memory in the step S1311. After executing the step S1309 or the step S1311, this process is finished.

As mentioned above, when the auto bounce start command is issued with the switch SW1 during the auto bounce control of the external flash device 120, the auto bounce in operation is stopped and the auto bounce control is redone in the second embodiment.

Moreover, when the auto bounce start command is issued with the switch SWAB or the switch ST_SWAB, it is determined whether the auto bounce control owing to the switch SW1 is in operation. When the auto bounce control owing to the switch SW1 is in operation, the auto bounce control is continuously performed without stopping. Accordingly, a user-friendly image pickup system is provided by making the external flash device 120 execute the auto bounce control owing to the switch SW1 with priority.

Although the embodiments of the invention have been described, the present invention is not limited to the above-mentioned embodiments, the present invention includes various modifications as long as the concept of the invention is not deviated. The embodiments mentioned above show examples of the present invention, and it is possible to combine the embodiments suitably.

Although the camera 100 to which the external flash device 120 is attachable is described in the above-mentioned description, the present invention is not limited to such a configuration. For example, the present invention may be applied to an image pickup apparatus equipped with a (built-in) flash device of which an irradiation direction (bounce angle) is variable.

In the above-mentioned description, the camera 100 is provided with the two switches SW1 and SWAB, and the external flash device 120 is provided with one switch ST_SWAB as a switch (button) that functions as an auto bounce start button.

However, the scope of the present invention is not limited to the above-mentioned embodiments. It is enough that a plurality of operation members for starting the auto bounce control, which include a first operation member for starting the photographing preparation and a second operation member that is different from the first operation member, are provided in the image pickup system that consists of the camera 100 and the external flash device 120. For example, an image pickup system of which a camera is not provided with a switch SWAB is also included in an embodiment of the present invention. Moreover, an operation to a plurality of operation members for starting auto bounce control is not limited to depression, but an operation according to configuration of an operation member is available.

Moreover, the auto bounce start button that makes the switch SWAB turn ON may not be a dedicated button for the auto bounce control, and may be a button that also serves for executing another function. For example, a modeling emission button, which makes a lighting device emit light in order to check what kind of light effect is obtained at the time of photography, may be used as the operation member for starting the auto bounce control when a mode in which the auto bounce control is performed is set.

Furthermore, the optimal bounce angle is automatically computed on the basis of the data obtained by the ranging photometry unit 203 and the flash orientation detection unit 205 in the external flash device 120 in the above-mentioned embodiment. However, the present invention is not restricted to this configuration. It may be configured so that the optimal bounce angle of the flash head 200b is computed on the basis of data obtained by the photometry unit 112, the lens control unit 114, the orientation detection unit 116, or the like of the camera 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-092720, filed Apr. 28, 2014, which is hereby incorporated by reference herein in its entirety.

What is claimed is:

1. An image pickup apparatus to which a lighting device that changes an irradiation direction of a light emitting section is mounted or is attachable, the image pickup apparatus comprising:
    a first operation switch configured to start automatic irradiation direction control that drives the light emitting section to direct in a determined irradiation direction, and to start photographing preparation;
    a second operation switch configured to start the automatic irradiation direction control;
    a processor configured to act as a control unit configured to continuously perform the automatic irradiation direction control in operation without stopping when said second operation switch is operated during the automatic irradiation direction control owing to the operation of said first operation switch,
    wherein said control unit starts the automatic irradiation direction control when said second operation switch is operated after execution of the automatic irradiation direction control owing to the operation of said first operation switch is finished.

2. The image pickup apparatus according to claim 1, wherein said control unit stops the automatic irradiation direction control in operation and redoes the irradiation direction control when said first operation switch is operated during the automatic irradiation direction control.

3. The image pickup apparatus according to claim 1, wherein said control unit starts the automatic irradiation direction control when said second operation switch is operated at time when the automatic irradiation direction control is not performed.

4. The image pickup apparatus according to claim 1, wherein said processor is further configured to act as a determination unit configured to determine whether said lighting device is under the automatic irradiation direction control on the basis of information transmitted from the lighting device.

5. An image pickup system comprising:
a lighting device configured to change an irradiation direction of a light emitting section, said lighting device comprising a lighting-device-side operation member configured to start automatic irradiation direction control that drives the light emitting section to direct in a determined irradiation direction;
an image pickup apparatus to which said lighting device is attached, said image pickup apparatus comprising:
a first operation switch configured to start the automatic irradiation direction control, and to start photographing preparation; and
a processor configured to act as a control unit configured to determine an irradiation direction automatically to perform the automatic irradiation direction control, to stop the automatic irradiation direction control in operation to redo the automatic irradiation direction when said first operation switch is operated during the automatic irradiation direction control, and to continuously perform the automatic irradiation direction control in operation without stopping when said lighting-device-side operation member is operated during the automatic irradiation direction control owing to the operation of said first operation switch.

6. The image pickup system according to claim 5, wherein said image pickup apparatus is provided with a second operation switch for starting the automatic irradiation direction control in addition to said first operation switch, and
wherein said control unit continuously performs the automatic irradiation direction control in operation without stopping when the second operation switch is operated during the automatic irradiation direction control owing to the operation of said first operation switch.

7. The image pickup system according to claim 5, wherein said lighting device is provided with a processor configured to act as a communication unit for transmitting and receiving information about the automatic irradiation direction control,
wherein said processor of said image pickup apparatus is further configured to act as a communication unit for transmitting and receiving information about the automatic irradiation direction control,
wherein the communication unit of said lighting device transmits information for notifying that the automatic irradiation direction control started, information for notifying that to the automatic irradiation direction control finished, information for notifying that the automatic irradiation direction control is in operation, and information for notifying that said lighting-device-side operation member was operated to the communication unit of said image pickup apparatus, and
wherein the communication unit of said image pickup apparatus transmits information for instructing to start the automatic irradiation direction control, information for instructing to stop the automatic irradiation direction control, and information for specifying the operation member that is operated to start the automatic irradiation direction control to the communication unit of said lighting device.

8. An automatic irradiation direction control method for an image pickup apparatus to which a lighting device that changes an irradiation direction of a light emitting section is mounted or is attachable, having a first operation switch that starts automatic irradiation direction control that drives the light emitting section to direct in a determined irradiation direction and starts photographing preparation, and a second operation switch that starts the automatic irradiation direction control, the automatic irradiation direction control method comprising:
starting the automatic irradiation direction control when either of the first operation switch and the second operation switch is operated;
performing the automatic irradiation direction control in operation continuously without stopping when the second operation switch is operated during the automatic irradiation direction control owing to the operation of the first operation switch,
wherein the automatic irradiation direction control is started when the second operation switch is operated after execution of the automatic irradiation direction control owing to the operation of the first operation switch is finished.

9. A non-transitory computer-readable storage medium storing an automatic irradiation direction control program causing a computer provided in an image pickup apparatus to execute the automatic irradiation direction control method according to claim 8.

10. An automatic irradiation direction control method for an image pickup system that is configured by attaching a lighting device that changes an irradiation direction of a light emitting section to an image pickup apparatus, the lighting device having a lighting-device-side operation member that starts automatic irradiation direction control that drives the light emitting section to direct in a determined irradiation direction, and the image pickup apparatus having a first operation switch that starts the automatic irradiation direction control and starts photographing preparation, the automatic irradiation direction control method comprising:
starting the automatic irradiation direction control when either of the first operation switch and the lighting-device-side operation member is operated; and
performing the automatic irradiation direction control in operation continuously without stopping when the lighting-device-side operation member is operated during the automatic irradiation direction control owing to the operation of the first operation switch.

11. A non-transitory computer-readable storage medium storing an automatic irradiation direction control program causing a computer provided in an image pickup apparatus to execute the automatic irradiation direction control method according to claim 10.

* * * * *